United States Patent [19]
Earnhardt

[11] Patent Number: 6,035,532
[45] Date of Patent: Mar. 14, 2000

[54] GROOVE MEANS IN A FUEL INJECTOR VALVE SEAT

[75] Inventor: Daniel E. Earnhardt, Seaford, Va.

[73] Assignee: Siemens Automotive Corporation, Auburn Hills, Mich.

[21] Appl. No.: 08/946,619

[22] Filed: Oct. 7, 1997

Related U.S. Application Data

[62] Division of application No. 08/594,538, Jan. 31, 1996.

[51] Int. Cl.[7] .................................................. B23P 13/00
[52] U.S. Cl. .................................. 29/890.122; 29/888.44
[58] Field of Search ........................... 29/888.44, 890.122

[56] References Cited

U.S. PATENT DOCUMENTS

| | | | |
|---|---|---|---|
| 500,216 | 6/1893 | Richards | 29/888.44 |
| 1,959,068 | 5/1934 | Stoll | 29/888.44 |
| 2,117,351 | 5/1938 | Nordstrom | 29/890.122 |
| 2,121,464 | 6/1938 | Zagorski | 29/888.44 |
| 2,241,735 | 5/1941 | Redsecker | 29/888.44 |
| 3,022,978 | 2/1962 | Kowalski et al. | 29/888.44 |
| 3,400,441 | 9/1968 | Fryling | 29/890.122 |
| 3,570,092 | 3/1971 | Miner | 29/890.122 |
| 3,755,876 | 9/1973 | Beasley | 29/890.122 X |
| 3,911,546 | 10/1975 | Schrock et al. | 29/157.1 |
| 4,766,405 | 8/1988 | Daly et al. | . |
| 5,228,468 | 7/1993 | Kapadia | . |
| 5,288,025 | 2/1994 | Cerny | . |
| 5,538,219 | 7/1996 | Osterbrink | . |
| 5,565,832 | 10/1996 | Haller et al. | . |
| 5,970,614 | 10/1999 | Adachi et al. | 29/888.44 D |

*Primary Examiner*—S. Thomas Hughes
*Assistant Examiner*—Steve Blount

[57] ABSTRACT

A method of manufacturing a conical valve seat, wherein the valve seat surface is placed in alignment with a cutting edge of a pattern impression pin, a predetermined amount of pressure is applied to the valve seat to move the seat surface relative to the cutting edge of a pattern impression pin to form a groove in the seat surface, hardening the seat member, and then grinding a conical surface on the seat surface to finish it.

2 Claims, 2 Drawing Sheets

GROOVE MEANS IN A FUEL INJECTOR VALVE SEAT

This is a divisional of copending application Ser. No. 08/594,538 filed on Jan. 31, 1996.

FIELD OF INVENTION

This invention relates to fluid valves in general and more particularly to the needle-valve seat interface in fuel injectors for internal combustion engines.

BACKGROUND OF INVENTION

In the present manufacture of fuel injectors for internal combustion engines, the interface between the needle and the valve seat is accomplished by spherical grinding and hardening the needle. The valve seat is shaped and then very precision grinding and hardening of the conical valve seat is performed. The result of this is typically a good needle-valve seat interface.

The disadvantages of the prior art processes are its cost both in terms of time and money. The grinding of the seat is a very expensive and time-consuming process. In mass production of fuel injectors, the conical grinding of valve seats requires very expensive machines and lots of them. A typical machine may cost in excess of five hundred thousand U.S. dollars annually. Add to this the cost of maintenance of these machines and the replacement of damaged or used components which can be in excess of fifteen thousand U.S. dollars, any cost savings which will increase production with any reduction in the required grinding time, is very much desired.

In the present invention, hardening of the needle and the valve seat is still required. But the time of the process of grinding to size is very much reduced. Thus, an advantage of the present invention is the reduction in the time required for grinding of the valve seat for millions of injectors each year.

It is another advantage of the invention to provide a valve needle-valve seat interface that use over time, "durability wear", does not result in any significant reduction of the amount of fuel flow past the valve seat for a given pulse time. In short, this advantage eliminates a "lean shift" in the dynamic flow rate of the injector.

Another advantage of the invention is the damping of the needle impact on the valve seat during operation of the fuel injector.

Another advantage of the invention is to reduce the closing spring force required by the return spring in the injector.

It is yet another advantage of the invention that by reducing the valve seat grinding time, the number of expensive grinding machines in manufacturing is reduced resulting in a savings in capital.

SUMMARY OF INVENTION

The above advantages and other advantages are found in an electromechanical fuel injector for an internal combustion engine having a needle or ball-shaped member mating with a conical valve seat member. The needle is secured to an armature member which is aligned with a stator member. A solenoid coil is wound around the stator member. A return spring biases the needle, through the armature, into sealing contact with the valve seat. The needle and valve seat control the flow of fuel from a source through a metering orifice located downstream of the valve seat. When the solenoid coil is energized, the needle lifts off the valve seat and fuel flows around the needle and out the metering orifice. The improvement is to the valve seat wherein a groove means is formed at the junction of the needle and the valve seat. The groove forms a pocket for holding fuel which functions as a dampener to the closing of the needle.

These and other advantages will become apparent from the following drawings and detailed description.

DETAILED DRAWINGS

DETAILED DESCRIPTION

Figure 1:
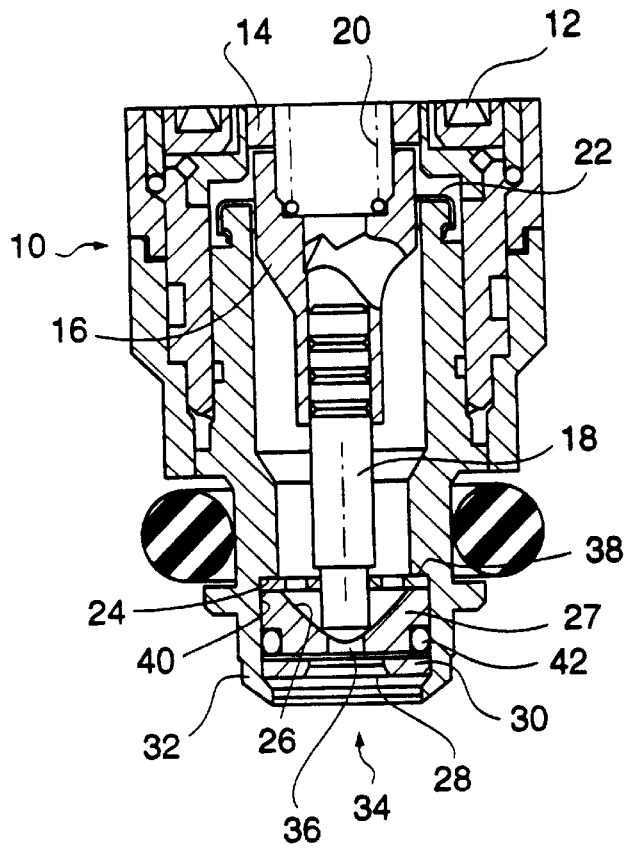
FIG. 1 is a sectional view of a valve body section of a fuel injector.

In FIG. 1, there is illustrated the valve body portion of a typical fuel injector or valve 10. In the injector illustrated, the fuel flow is from the top of the injector, the end nearest the top of the sheet, to the outlet end. This is called a top feed injector, but the principles of the invention can be used in any kind or type of valve, such as a bottom or side feed injector for any fluid such as water, gasoline, diesel fuel or an alternate fuel. The illustrated injector 10 has a solenoid 12, a stator 14, an armature 16, a needle 18, a bias spring 20, an upper guide 22, a lower guide 24, a valve seat 26, a valve seat member 27, an orifice plate 28, a back-up member 30 and a valve body 32.

The solenoid or electromagnetic coil 12 is responsive to a pulsed electrical signal to actuate the injector 10 to allow fuel to be ejected from the outlet end 34. When the coil 12 is energized, the magnetic circuit operates to attract the armature 16 to the stator 14. Connected to the armature 16 is the needle 18 which moves in a reciprocal manner. When the solenoid 12 is energized, the needle 1 8 leaves the valve seat 26 and fuel flows through the opening 36 in the valve seat member 27, through the orifice member 28 and out the outlet end 34.

The armature 16 is guided in its reciprocal motion by an upper guide 22 to maintain alignment. The needle 18 is guided by a lower guide 24, thus the armature-needle assembly reciprocally moves along the axis of the injector 10. When the solenoid 12 is de-energized, the bias spring 20 separates the armature 16 from the stator 14 and the needle 18 seats and seals in the valve seat 26. Although not concerned in the invention, the lower guide member 24 is maintained against a shoulder 38 in the valve body 32 by means of the valve seat member 27 which is contained in a bore 40 in the valve body 32. The valve seat member 27 is sealed to prevent fuel leakage by an O-ring seal 42. The metering orifice plate 28 is maintained against the valve seat member 27 by means of a back-up member or washer 30 which is held in place by a forming of the end of the valve body 32.

The lower guide member 24 has a central aperture which guides the needle 18 in its reciprocal motion. Surrounding the central aperture are a plurality of fuel flow apertures for allowing the fuel to flow to the valve seat 26. The metering orifice plate 28 in the preferred embodiment is a thin disk orifice member or members as illustrated in U.S. Pat. Nos. 4,854,024, 4,923,169 or 4,934,653.

Figure 2:
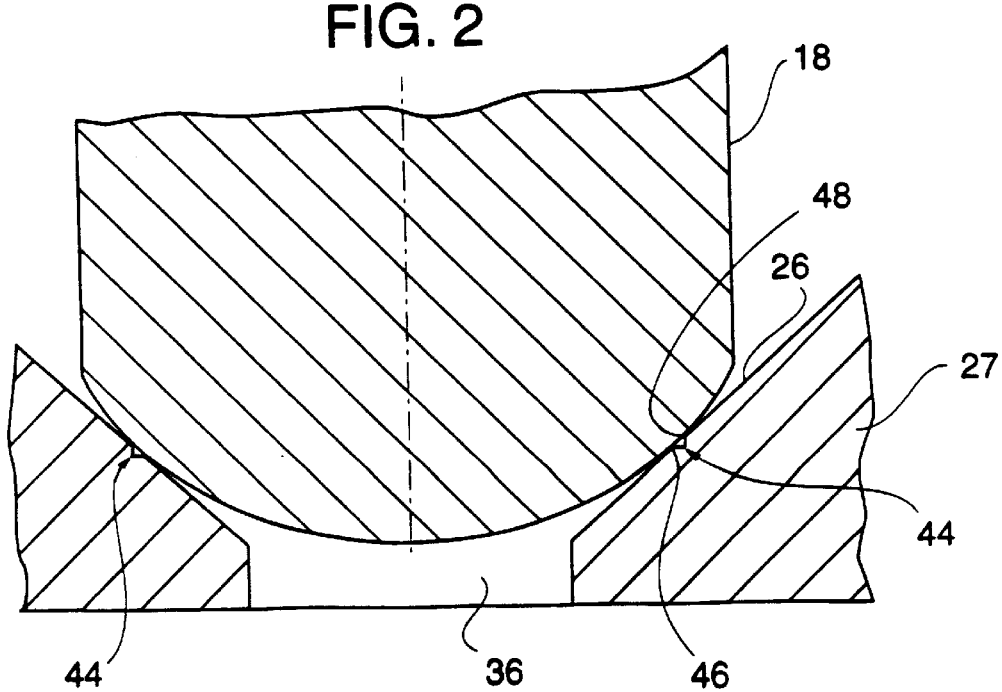
FIG. 2 is an enlarged sectional view of the needle and valve seat of the injector of FIG. 1.

Referring to FIG. 2, there is illustrated in an enlarged fashion the needle 18 and the valve seat 26 in a slightly open position for clarity. In the preferred embodiment the valve seat 26 is a conical surface and the needle 18 has a spherical end for mating with the valve seat surface 26. Circumferentially spaced in the conical valve seat 26, is a groove means 44 which is positioned where the needle 18 makes contact and seals with the valve seat 26. The needle 18 actually touches or seals on the downstream edge 46 of the groove means 44, which in FIG. 2 is toward the bottom of the drawing sheet. The needle 18 does not touch the upstream edge 48 of the groove, but is in 'virtual' contact. The size of the groove means 44 is kept small to minimize the effects on the flow rate of the injector 10.

The purpose of the groove means 44 in the valve seat member 27 is to avoid a shift in the dynamic flow rate of the injector, which would otherwise occur, due to component wear. Before, when the components would wear due-to the millions of operations, the wear between the needle 18 and the valve seat 26 created and "polished" a wide band of contact. The net result was a slow separation or release due to a 'jo-block' or vacuum-adhesion effect between the needle 18 and the valve seat 26. The net result is a "lean shift" in the dynamic flow rate of the injector for a given pulse width operation of the injector. The electrical actuation time is constant, but the actual separation time is less.

With the needle 18 and valve seat member 27 arranged as previously described, and also with the stator 14 and armature 16 mating surfaces positioned parallel to each other the valve is capable of operating with high alcohol-content fuels which have a very low lubricating characteristic. In the present valves, the lubrication found in most gasoline fuels operates to lubricate the surfaces to reduce wear. However, high alcohol-content fuels do not have as good a lubricating characteristic. The valve 10 constructed as illustrated allows alternate fuels to flow through the valve, without the typical adverse effects.

During closing of the valve without the groove means 44, as the needle 18 approaches the valve seat 26, the ever lowering pressure under the needle, which is caused by the ever increasing fuel flow velocity between the approaching needle and the valve seat, tends to draw or "suck" the needle 28 into the valve seat 26, increasing the impact force. The groove means 44, properly positioned, functions to dampen the impact of the needle 18 against the valve seat 26 by reducing the fuel flow velocity between the approaching needle and the valve seat. Fuel flowing past the groove means 44 creates a slight turbulence during flow and develops small pressure peaks which interrupt the high velocity fuel flow just before closing.

Another effect of the groove means 44 is in cooperation with the viscosity of the fuel, to provide a dampening effect for the seating of the needle 18 as the fuel is partially displaced from the groove means 44 on valve closure. This is due to the needle 18 'straddling' the groove means 44, landing on the downstream edge 46 and not touching, but coming into close proximity to, the upstream edge 48 of the groove means 44 and capturing an amount of fluid in the groove means.

Thus, the groove means 44 functions as a sealing means which seals the needle-valve seat interface; as a dampener for the needle 18;

and as a wear reduction means for the valve seat 26; to minimize any further widening of the needle-seat contact band with life cycling, caused by component wear and sometimes referred to as "durability wear", which widening creates dynamic fluid flow lean shifting which is essentially a reduction in the amount of fluid flowing through the valve 10.

Figure 4:
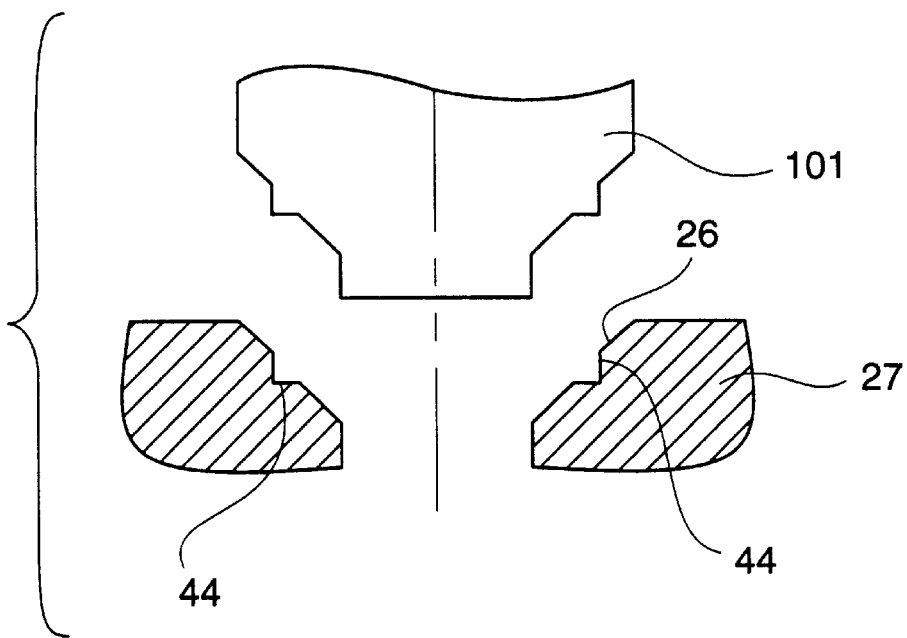
FIG. 4 is an enlarged sectional view of the valve seat of the injector of FIG. 1 and a pattern impression tool.
Figure 5:
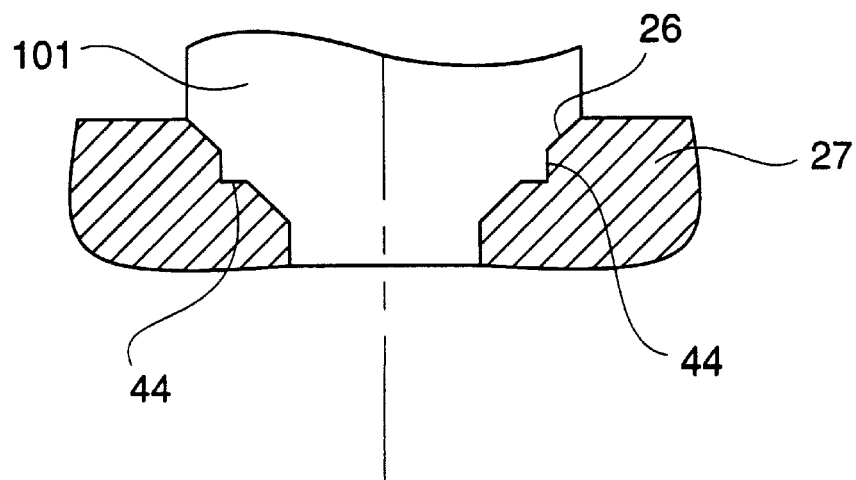
FIG. 5. is an enlarged sectional view of the valve seat of the injector of FIG. 1 in contact with a pattern impression tool.

A method of forming the groove means 44 in the valve seat surface 26 of a valve seat member 27 begins with securing the valve seat member 27 and placing the valve seat surface 26 in alignment with a cutting edge of a pattern impression tool, as shown in FIG. 4. Applying a predetermined amount of pressure to the valve seat member 27 for moving the valve seat surface 26 relative to the cutting edge of the pattern impression tool as shown in FIG. 5. As the pressure is continued the material properties of the valve seat member 27 and the pressure applied serves to limit the depth of the groove means 44. The valve seat member 27 is then removed from the fixture and hardened. A "touch grind" is then performed, on the valve seat surface 26 to finish the valve seat. In the preferred embodiment of the valve seat member 27, the valve seat surface 26 is a conical surface and the grinding serves to achieve the required roundness of the surface 26. Then the next step is to coin the downstream edge 46 of the groove means 44. One method of coining is with the actual needle member 18 which will be used in the injector assembly as described in U.S. Pat. No. 5,081,766 issued on Jan. 21, 1992 to Kellum, Jr. et al. and entitled "Method Of Making An Electrically-Operated Fluid Valve Having Improved Sealing Of The Valve Needle To The Valve Seat When The Valve Is Closed" which is incorporated herein by reference.

While there has been demonstrated a circumferential groove means 44 which in cross-section is virtually a right angled shape as illustrated in FIG. 2, it is understood that the groove means may have different geometrical shapes which function to increase the durability of the valve seat and reduce any durability related wear in the operation of the seat such as causing very small leaks to develop after millions of cycles. It is further understood that multiple grooves placed at various positions relative to the engaging valve member, may also be advantageous.

In addition, the 'jo-block' or vacuum-adhesion effects are also found between the several mating surfaces wherein one surface is, under the influence of force such as a spring force or an electromagnetic force, brought together with a second surface. An example is between the armature and stator of devices such as the fuel injector illustrated in FIG. 1 and FIG. 3. There the armature 50 is attracted to the stator 52 as a result of the energization of a solenoid coil. The mating surfaces 54 and 56 of the armature 50 and the stator 52 are parallel to each other and typically along the axis of the valve. Several similar armatures have a very hard non-magnetic plated surface which resists wear due to the "hammering" effect.

Figure 3:
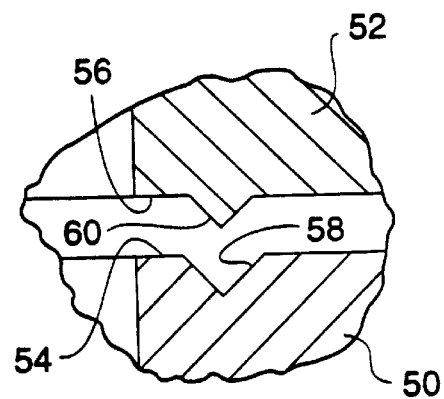
FIG. 3 is an enlarged sectional view of an alternate embodiment.

However, the principles of the present invention can be applied as illustrated in the embodiment of FIG. 3. This is accomplished by groove 44 means comprising a circumferential ring or groove 58 placed on the surface of the armature 50 or stop plate. Since the orientation of the injector is such that the fluid flows in a direction that maybe be described as from stator to armature, the fluid will stay in or is captured by the ring 58 and provide a hydraulic dampening means to the relative movement of the armature 50 with respect to the stator 52. While this may increase the closing time due to an adhesion effect of the fluid to the smooth surface of the stator, such time is constant from the first operation of the injector to the last operation, many millions of cycles later. Contrary to a pair of surfaces which are both smooth, and which over time will become "mated" to each other and thereby "jo-blocked". As a result of durability wear this groove means 58 will not wear to cause "jo-blocking".

In FIG. 3 the groove 58 captures the fluid to function as a dampening means between mating members 50 and 52. In this illustration, the stator member 52 has a circumferential ring or bead 60 around its face 56. Directly opposite and on the armature 50 is a circumferential groove 58, which is a little deeper than the height of the bead, which functions to capture fluid. As the armature 50 moves relative to the stator 52, the bead 60 makes contact first with the fluid in the groove means 58 which dampens the travel of the armature as it closes in on the face of the stator. The fluid is substantially displaced from the groove means 58 by the bead 60. In as much as this mechanism is upstream from the metering orifice 28, the amount of fluid ejected from the valve is not affected. While a circumferential ring or bead and corresponding groove is shown, the main consideration is that the geometries of each face 54, 56 be mirror images. Contrast this with the flat, smooth stator face and the grooved face found on the armature in U.S. Pat. No. 4,712,767 issued on Dec. 15, 1987 to Losser et al. and entitled "Solenoid Control Valve", which is incorporated herein by reference. In that patent, grooves are connected to several bores which function to conduct the fluid away from the surface to reduce surface adhesion.

A method for forming a groove in at least one of the mating surfaces of the stator or armature has the steps of securing either one of the stator or armature member wherein the groove is to made. Placing the mating surface of the member in alignment with a cutting edge of a pattern impression tool. Applying a predetermined amount of pressure to the member for moving the mating surface relative to the cutting edge of the pattern impression tool. Forming the groove in the mating surface to a predetermined depth. Hardening at least the mating surface of the member having the groove formed therein. Grinding the mating surface of the member for finishing the mating surface. The groove formed in the mating surface is circumferential and provides a means for capturing an amount of fluid therein for hydraulic dampening to the closure of the stator and the armature. A similar process is used to form the corresponding geometry such as a bead in the other mating part. However in this instance, the face of the other mating part has formed thereon a raise bead, ring, or other similar geometry which has a height from the surface of the face that is less than the depth of the groove in the other member.

There has thus been shown and described an improvement in the forming of the valve seat 26 in a fluid valve such as a fuel injector and for improving the durability wear of the needle 18 and the valve seat 26 and also the mating parallel surfaces of the armature 50 and stator 52.

What is claimed is:

1. A method of forming a groove in a valve seat surface of a valve seat member of an electromechanical valve comprising the steps of:

securing a valve seat member;

placing a valve seat surface of the valve seat member in alignment with a cutting edge of a pattern impression pin;

applying a predetermined amount of pressure to the valve seat member for moving the seat surface relative to the cutting edge of the pattern impression pin;

forming a groove in the valve seat surface with the cutting edge;

hardening the valve seat member; and grinding a conical surface of the seat for finishing the surface of the valve seat surface.

2. In the method of claim 1 additionally including the step of coining a downstream edge of the groove after grinding.

* * * * *